United States Patent
Chen et al.

(10) Patent No.: US 9,900,619 B2
(45) Date of Patent: Feb. 20, 2018

(54) INTRA-CODING OF DEPTH MAPS FOR 3D VIDEO CODING

(75) Inventors: Ying Chen, San Diego, CA (US); Xin Zhao, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 14/409,785

(22) PCT Filed: Jul. 9, 2012

(86) PCT No.: PCT/CN2012/000942
§ 371 (c)(1),
(2), (4) Date: Mar. 12, 2015

(87) PCT Pub. No.: WO2014/005248
PCT Pub. Date: Jan. 9, 2014

(65) Prior Publication Data
US 2015/0245061 A1    Aug. 27, 2015

Related U.S. Application Data

(60) Provisional application No. 61/667,400, filed on Jul. 2, 2012.

(51) Int. Cl.
| | |
|---|---|
| *H04N 19/597* | (2014.01) |
| *H04N 19/105* | (2014.01) |
| *H04N 19/159* | (2014.01) |
| *H04N 19/196* | (2014.01) |

(Continued)

(52) U.S. Cl.
CPC ......... *H04N 19/597* (2014.11); *H04N 19/105* (2014.11); *H04N 19/107* (2014.11); *H04N 19/159* (2014.11); *H04N 19/176* (2014.11)

(58) Field of Classification Search
None
See application file for complete search history.

(56) References Cited

U.S. PATENT DOCUMENTS

2012/0093226 A1    4/2012   Chien et al.

FOREIGN PATENT DOCUMENTS

| CN | 102209243 A | 10/2011 |
|---|---|---|
| EP | 2387244 A2 | 11/2011 |
| WO | 2012020092 A1 | 2/2012 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Kate Luo
(74) *Attorney, Agent, or Firm* — Shumaker & Sieffert, P.A.

(57) ABSTRACT

In one example, a device for coding video data includes a video coder configured to determine, for a depth block of a depth component of video data, a co-located texture block of a corresponding texture component, and when at least a portion of the texture block corresponds to a prediction unit of the texture component that is not intra-prediction coded: disable an inter-component Wedgelet depth modeling mode for the depth block, select an intra-prediction coding mode for the depth block other than the disabled inter-component Wedgelet depth modeling mode, and code the depth block using the selected intra-prediction coding mode.

29 Claims, 9 Drawing Sheets

(51) Int. Cl.
H04N 19/176 (2014.01)
H04N 19/107 (2014.01)

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Heiko, et al., "Test Model under Consideration for HEVC Based 3D Video Coding", International Organisation for Standardisation Organisation Internationale De Normalisation ISO/IEC JTC1/SC29/WG11 Coding of Moving Pictures and Audio, ISO/IEC JTCI/SC29/WG11 MPEG2011/NI2559, Feb. 2012, 44 pp.
International Preliminary Report on Patentability from International Application No. PCT/CN2012/000942, dated Nov. 4, 2014, 8 pp.
International Search Report and Written Opinion from International Application No. PCT/CN2012/000942, dated Apr. 11, 2013, 11pp.
Merkle, et al., "3D Video: Depth Coding Based on Inter-component Prediction of Block Partitions", 2012 Picture Coding Symposium, May 7-9, 2012, Krakow, Poland, pp. 149-152.
Schwarz, et al., "3D Video Coding Using Advanced Prediction, Depth Modeling, and Encoder Control Methods", 2012 Picture Coding Symposium, May 7-9, 2012, Krakow, Poland, 4 pp.
Van, et al., "3D Video Compression Based on High Efficiency Video Coding", IEEE Transactions on Consumer Electronics, vol. 58, No. 1, Electronic version published Mar. 21, 2012, 9 pp.
Schwarz, et al., "Description of 3D Video Technology Proposal by Fraunhofer HHI (HEVC compatible; configuration A)," ISO/IEC JTC1/SC29/WG11 MPEG2011/M22570, Geneva, Switzerland, Nov. 2011, 48 pp.
Schwarz, H., et al., "Description of 3D Video Technology Proposal by Fraunhofer HHI (HEVC compatible, configuration B)", MPEG Meeting; Geneva; (Motion Picture Expert Group or ISO/IEC JTC1/SC29/WG11), No. m22571, Nov. 22, 2011, XP030051134; 46 pp.
Bartnik, et al., "HEVC Extension for Multiview Video Coding and Multiview Video plus Depth Coding", ITU Telecommunications Standardization Sector Study Group 16 Question 6 Video Coding Experts Group (VCEG), 44nd Meeting: San Jose, CA, USA, Feb. 3-10, 2012, Document VCEG-AR13, 42 pages.
Zhao X., et al., "3D-CE6.h related: Depth Modeling Mode (DMM) 3 simplification for HTM", JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16 ); URL: http://phenix.int-evry.fr/jct2/, No. JCT2V-A0098, XP030130097, Jul. 11, 2012, 5 pp.

INTRA-CODING OF DEPTH MAPS FOR 3D VIDEO CODING

This application is a national stage entry under 35 U.S.C. §371 of International Application No. PCT/CN2012/000942, filed Jul. 9, 2012, which claims the benefit of U.S. Provisional Application Ser. No. 61/667,400, filed Jul. 2, 2012, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

A recent draft of the upcoming HEVC standard, referred to as "HEVC Working Draft 7" or "WD7" is described in document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Jul. 5, 2012, is downloadable from http://phenix.it-sudparis.eu/jct/doc_end_user/documents/9'_Geneva/wg11/JCTVC-I1003-v5.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding depth maps of three-dimensional (3D) video data. In particular, this disclosure describes techniques for intra-prediction coding of depth maps of 3D video data. These techniques may be used to reduce the complexity of 3D video coding relative to, for example 3D high efficiency video coding (3D-HEVC) techniques. The techniques of this disclosure generally relate to depth modeling modes (DMMs) for intra-coding blocks of depth maps. For example, these techniques may be used to signal how a block of a depth map is to be partitioned for intra-predictive coding.

In one example, a method of coding video data includes determining, for a depth block of a depth component of video data, a co-located texture block of a corresponding texture component, and when at least a portion of the texture block corresponds to a prediction unit of the texture component that is not intra-prediction coded: disabling an inter-component Wedgelet depth modeling mode for the depth block, selecting an intra-prediction coding mode for the depth block other than the disabled inter-component Wedgelet depth modeling mode, and coding the depth block using the selected intra-prediction coding mode.

In another example, a device for coding video data includes a video coder configured to determine, for a depth block of a depth component of video data, a co-located texture block of a corresponding texture component, and when at least a portion of the texture block corresponds to a prediction unit of the texture component that is not intra-prediction coded: disable an inter-component Wedgelet depth modeling mode for the depth block, select an intra-prediction coding mode for the depth block other than the disabled inter-component Wedgelet depth modeling mode, and code the depth block using the selected intra-prediction coding mode.

In another example, a device for coding video data includes means for determining, for a depth block of a depth component of video data, a co-located texture block of a corresponding texture component, means for disabling an inter-component Wedgelet depth modeling mode for the depth block when at least a portion of the texture block corresponds to a prediction unit of the texture component that is not intra-prediction coded, means for selecting an intra-prediction coding mode for the depth block other than the disabled inter-component Wedgelet depth modeling mode when at least a portion of the texture block corresponds to a prediction unit of the texture component that is not intra-prediction coded, and means for coding the depth block using the selected intra-prediction coding mode when at least a portion of the texture block corresponds to a prediction unit of the texture component that is not intra-prediction coded.

In another example, a computer-readable storage medium has stored thereon instructions that, when executed, cause a processor to determine, for a depth block of a depth component of video data, a co-located texture block of a corresponding texture component, and when at least a portion of the texture block corresponds to a prediction unit of the texture component that is not intra-prediction coded: disable an inter-component Wedgelet depth modeling mode for the depth block, select an intra-prediction coding mode for the depth block other than the disabled inter-component Wedgelet depth modeling mode, and code the depth block using the selected intra-prediction coding mode.

In another example, a method of coding video data includes determining, for a depth block of a depth component of video data, a co-located texture block of a corresponding texture component, determining an intra-prediction mode used to code at least a portion of the texture block, determining a Wedglet pattern for a depth modeling mode for coding the depth block by searching a set of Wedglet patterns associated with the intra-prediction mode of the texture block, and coding the depth block using the determined Wedglet pattern and the depth modeling mode.

In another example, a device for coding video data includes a video coder configured to determine, for a depth block of a depth component of video data, a co-located texture block of a corresponding texture component, determine an intra-prediction mode used to code at least a portion of the texture block, determine a Wedglet pattern for a depth modeling mode for coding the depth block by searching a set of Wedglet patterns associated with the intra-prediction mode of the texture block, and code the depth block using the determined Wedglet pattern and the depth modeling mode.

In another example, a device for coding video data includes means for determining, for a depth block of a depth component of video data, a co-located texture block of a corresponding texture component, means for determining an intra-prediction mode used to code at least a portion of the texture block, means for determining a Wedglet pattern for a depth modeling mode for coding the depth block by searching a set of Wedglet patterns associated with the intra-prediction mode of the texture block, and means for coding the depth block using the determined Wedgelet pattern and the depth modeling mode.

In another example, a computer-readable storage medium having stored thereon instructions that, when executed, cause a processor to determine, for a depth block of a depth component of video data, a co-located texture block of a corresponding texture component, determine an intra-prediction mode used to code at least a portion of the texture block, determine a Wedglet pattern for a depth modeling mode for coding the depth block by searching a set of Wedglet patterns associated with the intra-prediction mode of the texture block, and code the depth block using the determined Wedgelet pattern and the depth modeling mode.

The details of one or more examples are set forth in the accompanying drawings and the description below. Other features, objects, and advantages will be apparent from the description and drawings, and from the claims.

DETAILED DESCRIPTION

Figure 1:
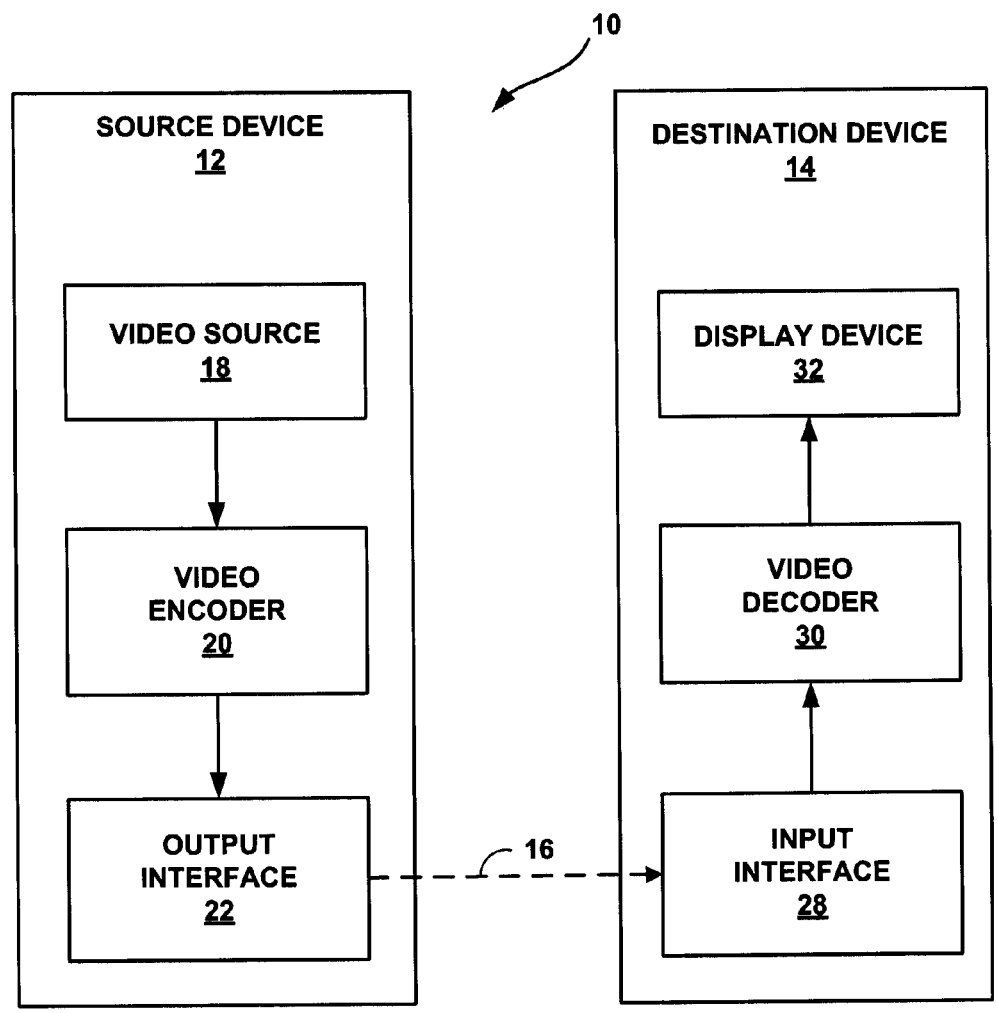
FIG. 1 is a block diagram illustrating an example video encoding and decoding system that may utilize techniques for signaling depth modeling modes for depth map coding.

In general, the techniques of this disclosure are related to three-dimensional (3D) video coding. That is, video data coded using these techniques may be rendered and displayed to produce a three-dimensional effect. For example, two images of different views (that is, corresponding to two camera perspectives having slightly different horizontal positions) may be displayed substantially simultaneously such that one image is seen by a viewer's left eye, and the other image is seen by the viewer's right eye.

This 3D effect may be achieved using, for example, stereoscopic displays or autostereoscopic displays. Stereoscopic displays may be used in conjunction with eyewear that filters the two images accordingly. For example, passive glasses may filter the images using polarized lenses or different colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture pictures and corresponding depth pictures.

As noted above, images may correspond to a particular temporal instance. Video data may be represented using a sequence of access units, where each access unit includes all data corresponding to a particular temporal instance. Thus, for example, for multiview video data plus depth, texture images from each view for a common temporal instance, plus the depth maps for each of the texture images, may all be included within a particular access unit. An access unit may include data for a texture component, corresponding to a texture image, and a depth component, corresponding to a depth map. In this manner, 3D video data may be represented using a multiview video plus depth format, in which captured or generated views (texture) are associated with corresponding depth maps. Moreover, in 3D video coding, textures and depth maps may be coded and multiplexed into a 3D video bitstream. Depth maps may be coded as grayscale images, where "luma" samples (that is, pixels) of the depth maps represent depth values. Conventional intra- and inter-coding methods can be applied for depth map coding.

Depth maps commonly include sharp edges and constant areas, and edges in depth maps typically present strong correlations with corresponding texture data. Due to the different statistics and correlations between texture and corresponding depth, different coding schemes have been and continue to be designed for depth maps based on a 2D video codec. Some coding schemes that are particular to depth map coding, as discussed in greater detail below, relate to partitioning blocks of a depth map into various prediction regions. For example, blocks of a depth map may be partitioned using Wedgelet patterns or Contour patterns, as described in greater detail below. In general, Wedgelet patterns are defined by an arbitrary line drawn through a block of depth map data, while in Contour partitioning, a depth block may be partitioned into two irregularly-shaped regions.

The techniques of this disclosure may be used in conjunction with 3D video coding based on advanced codecs (encoders/decoders), including multiview video plus depth coding techniques. In various examples, the proposed depth coding techniques of this disclosure may include searching for an optimal partitioning pattern for depth information based on coded information of corresponding texture information of a texture view component. That is, a block of depth information may be partitioned and coded based on the coding of a block of texture information corresponding to (e.g., spatially co-located with) the block of depth information.

Proposals have been made to extend the upcoming HEVC standard to support 3D video coding, referred to as 3D-HEVC. 3D-HEVC is based on solutions proposed in Schwarz et al., "Description of 3D Video Coding Technology Proposal by Fraunhofer HHI (HEVC compatible configuration A)," MPEG Meeting ISO/IEC JTC1/SC29/WG11, Doc. MPEG11/M22570, Geneva, Switzerland, November/December 2011 and Schwarz et al, "Description of 3D Video Technology Proposal by Fraunhofer HHI (HEVC compatible; configuration B)," MPEG Meeting—ISO/IEC JTC1/SC29/WG11, Doc. MPEG11/M22571, Geneva, Switzerland, November/December 2011.

Development of HEVC includes development of an HEVC test model (HTM). HTM version 3.1 for 3D-HEVC can be downloaded, as of Jul. 5, 2012, from https://hevc.hhi.fraunhofer.de/svn/svn_3DVCSoftware/tags/HTM-3.1/. A description of the HTM software is available, as of Jul. 5, 2012, from http://wg11.sc29.org/doc_end_user/documents/100_Geneva/wg11/w12744-v2-w12744.zip.

In 3D-HEVC, each access unit contains multiple view components, and each of the view components contains a unique view id, or view order index, or layer id. A view component contains a texture view component as well as a depth view component in 3D-HEVC. In 3D-HEVC, a texture view component is coded as one or more texture slices, while the depth view component is coded as one or more depth slices. Moreover, in 3D-HEVC, the same definition of intra prediction modes is utilized as conventional HEVC. In addition, the angle of directional intra prediction modes may be further indicated as (H, V), with the value roughly being equal to H/V. The possible (H, V) combinations for the Intra modes are listed in Table 1, wherein each prediction mode indexed by 2 through 34 corresponds to one (H, V) combination.

TABLE 1

| Intra Mode Index | 2 | 3 | 4 | 5 | 6 | 7 | 8 | 9 | 10 | 11 | 12 |
|---|---|---|---|---|---|---|---|---|---|---|---|
| H | 32 | 32 | 32 | 32 | 32 | 32 | 32 | 32 | 32 | 32 | 32 |
| V | 32 | 26 | 21 | 17 | 13 | 9 | 5 | 2 | 0 | −2 | −5 |
| Intra Mode Index | 13 | 14 | 15 | 16 | 17 | 18 | 19 | 20 | 21 | 22 | 23 |
| H | 32 | 32 | 32 | 32 | 32 | 32 | 26 | 21 | 17 | 13 | 9 |
| V | −9 | −13 | −17 | −21 | −26 | −32 | −32 | −32 | −32 | −32 | −32 |
| Intra Mode Index | 24 | 25 | 26 | 27 | 28 | 29 | 30 | 31 | 32 | 33 | 34 |
| H | 5 | 2 | 0 | 2 | 5 | 9 | 13 | 17 | 21 | 26 | 32 |
| V | −32 | −32 | 32 | 32 | 32 | 32 | 32 | 32 | 32 | 32 | 32 |

3D-HEVC includes depth modeling modes (DMMs) that may be used to code an intra-prediction unit of a depth slice. DMMs of 3D-HEVC are described in greater detail below with respect to FIGS. 5A and 5B. In general, DMMs of 3D-HEVC include partitioning a block of depth video data into two regions, e.g., using a Wedgelet partitioning pattern or a Contour partitioning pattern. 3D-HEVC currently includes four DMMs: mode 1 (explicit Wedgelet signaling), mode 2 (intra-predicted Wedgelet partitioning), mode 3 (inter-component Wedgelet partitioning), and mode 4 (inter-component Contour partitioning).

This disclosure recognizes that certain problems may arise from the current design of the DMM pattern derivation of 3D-HEVC. For example, DMM mode 3 of the current 3D-HEVC design requires a significant decoder complexity increase, since all possible Wedgelet patterns (which can number around 1500) on the co-located texture region are exhaustively checked to determine the Wedgelet pattern used by the current prediction unit of a depth slice, regardless of the prediction mode of the co-located texture prediction unit. This disclosure describes various techniques related to improved signaling of DMMs, e.g., for 3D-HEVC, although it should be understood that these techniques may be implemented with respect to other video coding standards as well. These techniques are described with respect to the example of 3D-HEVC merely for purposes of explanation, and are not limited to 3D-HEVC.

FIG. 1 is a block diagram illustrating an example video encoding and decoding system 10 that may utilize techniques for signaling depth modeling modes for depth map coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for signaling depth modeling modes for depth map coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for signaling depth modeling modes for depth map coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together With the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In one example asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, a video coder, such as video encoder 20 or video decoder 30, may signal depth modeling modes for depth map coding. Currently in 3D-HEVC, there are four general depth modeling modes (DMMs). In the example of 3D-HEVC, these modes are described as follows:

1. Mode 1: Explicit Wedgelet Signaling
    Wedgelet partitioning is applied in this mode and the optimal or desirable one is selected at the encoder based on a certain distortion criterion. The index of the selected Wedgelet pattern is signaled in the bitstream.
2. Mode 2: Intra-predicted Wedgelet Partitioning
    Wedgelet partitioning is applied in this mode and the selected Wedgelet pattern is predicted using the information of neighboring intra prediction mode and Wedgelet pattern information. In this case, the direct signaling of the Wedgelet pattern index is avoided, and a refinement of the predicted Wedgelet pattern is signaled.
3. Mode 3: Inter-component Wedgelet Partitioning
    All available Wedgelet patterns are exhaustively tried on the co-located luma texture blockregion of the same access unit, and the one which matches the texture block best is selected as the Wedgelet partition for the PU in the depth slice. No signaling of Wedgelet partitioning pattern is needed, but an exhaustive search of the best pattern may be required at the decoder (outside of the techniques of this disclosure).
4. Mode 4: Inter-component Contour Partitioning
    In this mode, a Contour partitioning pattern is generated during the decoding process by separating a co-located texture block into two parts: the first part contain pixels with luma sample values larger than the average value, and the second part contain pixels with luma sample values less than or equal to the average.

The number of different partitioning patterns for a DMM may depend on the size of the block to be coded using the DMM. For example, in 3D-HEVC, there are 86 Wedgelet patterns for 4×4 blocks, 782 Wedgelet patterns for 8×8 blocks, 1394 Wedgelet patterns for 16×16 blocks, and 1503 Wedgelet patterns for 32×32 blocks. These patterns are generated and stored during both encoding and decoding. That is, video encoder 20 and video decoder 30 may generate and store the various Wedgelet patterns. The four DMMs of 3D-HEVC may be defined based on the type (e.g., Wedgelet or Contour partitioning) and method of derivation (e.g., explicit signaling, intra-predicted, or inter-component). Moreover, which DMMs are available for coding a block may depend on the size of the block. Table 2 summarizes which DMMs are available for various block sizes in the example of 3D-HEVC:

TABLE 2

| PU size | Available DMM modes |
|---|---|
| 4 × 4 | Mode 1, Mode 3 |
| 8 × 8 | Mode 1, Mode 2, Mode 3, Mode 4 |
| 16 × 16 | Mode 1, Mode 2, Mode 3, Mode 4 |
| 32 × 32 | Mode 1, Mode 2, Mode 3, Mode 4 |
| 64 × 64 | None |

As shown in Table 2, in 3D-HEVC, for block (e.g., PU) sizes less than or equal to 4×4, only Modes 1 and 3 are enabled, for PU sizes larger than 4×4 but less than 64×64, i.e., 8×8, 16×16 and 32×32, all four modes are enabled. For PU size larger than or equaling to 64×64, all four modes are disabled in 3D-HEVC.

As can be seen in Table 2, Mode 3 (that is, inter-component Wedgelet partitioning) is available for all block sizes up to, but not including, 64×64 in 3D-HEVC. However, as noted above, this disclosure recognizes certain problems with Mode 3, e.g., that implementing Mode 3 requires significant complexity increases at a video decoder, such as video decoder 30. Therefore, this disclosure describes various techniques that may be used to reduce this complexity.

Figure 6A:
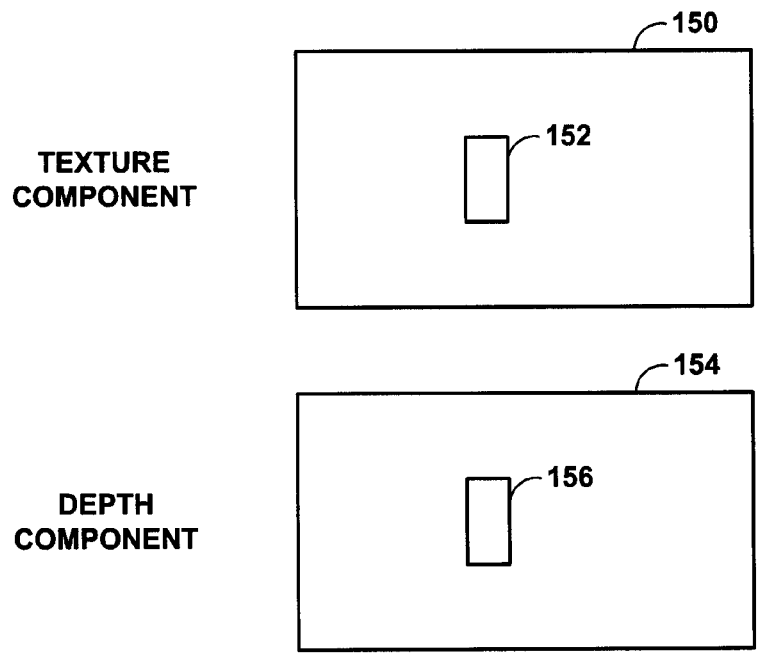
FIGS. 6A and 6B illustrate examples of depth blocks in a depth component and co-located texture blocks in a corresponding texture component.
Figure 6B:
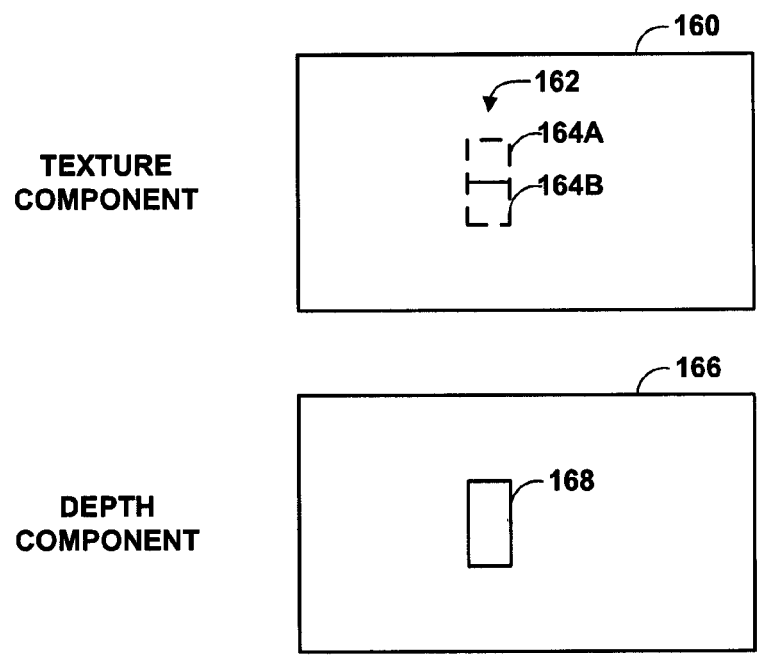

The techniques of this disclosure generally relate to determining whether to enable or disable Mode 3 for a depth block based on coding characteristics of a co-located texture block. In the discussion below, the depth block may represent a prediction unit of a coding unit in a depth component. A texture block that is co-located with the depth block generally corresponds to a block of pixels in a texture image, where the depth map and the texture image correspond to the same view and the same temporal instance. For example, a single view component of an access unit may include data for both a texture view component representing the texture image and a depth view component representing the depth map. Examples of texture blocks and co-located depth blocks are shown in FIGS. 6A and 6B, as discussed in greater detail below.

In general, a texture block co-located with the depth block is a texture block that is located in the same relative position within the texture image as the depth block in the depth map. For example, assuming the texture image and the depth map have the same spatial resolution (that is, the same number of pixels horizontally and vertically), the texture block that is co-located with the depth block may be the texture block that has the same horizontal offset relative to a left edge of the texture picture as the horizontal offset of the depth block relative to a left edge of the depth map, and the same vertical offset relative to a top edge of the texture picture as the vertical offset of the depth block relative to a top edge of the depth map. If the texture image and depth map have different spatial resolutions, the horizontal and vertical offsets described above may be scaled proportionally to the scaled difference between the spatial resolutions of the horizontal and vertical offsets.

In some examples, video encoder 20 and video decoder 30 may be configured to determine whether the inter-component Wedgelet mode (DMM Mode 3) is enabled or disabled for a depth block based on whether at least a portion of a co-located texture block is (or is not) intra-prediction coded.

In some examples, video encoder 20 and video decoder 30 may be configured to disable the inter-component Wedgelet mode for the depth block when the co-located texture block does not fully belong to a PU of the texture image that is Intra-prediction mode coded. In some examples, video encoder 20 and video decoder 30 may be configured to disable the inter-component Wedgelet mode for the depth block when the co-located texture block does not fully belong to a PU of the texture image that is Intra-prediction mode coded using a mode other than DC and planar modes (e.g., a directional intra-prediction mode).

In some examples, video encoder 20 and video decoder 30 may be configured to disable the inter-component Wedgelet mode for the depth block when a top-left 4×4 sub-block of the co-located texture block is not intra-prediction mode coded. In some examples, video encoder 20 and video decoder 30 may be configured to disable the inter-component Wedgelet mode for the depth block when a top-left 4×4 sub-block of the co-located texture block is intra-prediction mode coded using either DC or planar mode.

In some examples, video encoder 20 and video decoder 30 may be configured to disable the inter-component Wedgelet mode for the depth block when the co-located texture block belongs to a slice other than an Intra-slice (I-slice), that is, when the texture block is included within an inter-slice (e.g., a P-slice or a B-slice). In some examples, video encoder 20 and video decoder 30 may be configured to disable the inter-component Wedgelet mode for the depth block when a depth slice has a co-located texture block, part of which is coded as not Intra. In some examples, video encoder 20 and video decoder 30 may be configured to disable the inter-component Wedgelet mode for the depth block when the texture block corresponds to several PUs in the texture image, and none of the PUs to which the texture block corresponds is intra-prediction mode coded.

Video encoder 20 and video decoder 30 may be configured to disable the inter-component Wedgelet mode in any or all of the scenarios described above, in any combination. In cases where the inter-component Wedgelet mode is enabled, and the texture block corresponds to a single PU that is intra coded, video encoder 20 and video decoder 30 may be configured to predict the Wedgelet pattern of the depth block using the intra prediction mode of the texture block. For example, each Wedgelet pattern may be assigned with one of the 33 directional intra prediction modes of 3D-HEVC. Video encoder 20 and video decoder 30 may be configured with data that assigns a Wedgelet pattern to an intra-prediction mode.

In some examples, video encoder 20 and video decoder 30 may be configured with data that assigns an intra-prediction mode to a set of Wedgelet patterns based on certain criteria. Each of the 33 intra prediction modes of 3D-HEVC may be assigned the same number of Wedgelet patterns, in some examples. For a given texture intra-prediction mode, video encoder 20 and video decoder 30 may be configured to search only the set of Wedgelet patterns that are associated with that texture intra-prediction mode. In other words, only the Wedgelet patterns associated with the intra-prediction mode for the co-located texture block may be checked when deriving a final Wedgelet pattern. In some examples, the set of Wedgelet patterns associated with a particular angular intra-prediction mode may be Wedgelet patterns that have partition lines that closely match the angle of the intra-prediction mode. For example, the set of Wedgelet patterns may include Wedgelet patterns that are parallel to, substantially parallel to, and/or within a certain degree of parallel to the angle of the angular intra-prediction mode. In this manner, a video coder, such as video encoder 20 or video decoder 30, may simply search Wedgelet patterns that have angles similar to the angle of an angular intra-prediction mode used to code a co-located texture block when determining a Wedgelet pattern to use for DMM mode 3.

In some examples, only when the co-located texture block fully belongs to a PU that is intra-coded, and the intra-prediction mode is not DC or Planar, video encoder 20 and video decoder 30 may use the intra-prediction mode of the co-located texture block to predict the Wedgelet pattern of the current depth PU. In some examples, only when a top-left 4×4 sub-block of the co-located texture block fully is intra-coded, and the intra-prediction mode is not DC or Planar, video encoder 20 and video decoder 30 may use the intra-prediction mode of the co-located texture block to predict the Wedgelet pattern of the current depth PU. In some examples, only when a top-left 4×4 sub-block of the co-located texture block fully is intra-coded, video encoder 20 and video decoder 30 may use the intra-prediction mode of the co-located texture block to predict the Wedgelet pattern of the current depth PU.

Video encoder 20 and video decoder 30 may be configured to perform any or all of the techniques for predicting the Wedgelet pattern from the intra-prediction mode of the texture block, alone or in any combination. Moreover, video encoder 20 and video decoder 30 may perform any or all of the techniques for predicting the Wedgelet pattern from the intra-prediction mode of the texture block in any combination with any or all of the techniques for disabling the inter-component Wedgelet mode of the scenarios described above.

Furthermore, when DMM inter-component Wedgelet mode is disabled, e.g., using any or all of the techniques described above, the signaling of DMM modes may be modified as follows. For depth block sizes larger than 4×4 but smaller than 64×64, e.g., 8×8, 16×16, and 32×32, the number of available DMM modes may be changed from 4 to 3. Alternatively, inter-component Wedgelet mode may be signaled as mode 4, and inter-component Contour may be signaled as mode 3. That is, the values used to signal inter-component Wedgelet mode and inter-component Contour mode of 3D-HEVC may be swapped when inter-component Wedgelet mode is disabled.

Alternatively, the index of one mode in DMM modes 1, 2, and 4 may be binarized as one bit, and the indexes of the other two may be binarized as two bits. For example, mode 1 may be binarized as one bit (e.g., "0"), and modes 2 and 4 may be binarized using two bits (e.g., "10" and "11," respectively). Alternatively, index values for DMM modes 1, 2, and 4 may be unary binarized. For example, mode 1 may be binarized as "1," mode 2 may be binarized, as "11," and mode 3 may be binarized as "111." For PU sizes less than or equal to 4×4, the number of DMM modes may be changed from 2 to 1. Moreover, no index value for the DMM mode need be coded (e.g., sent or received) to indicate the DMM mode when the number of DMM modes is changed from 2 to 1. Instead, the DMM mode may be derived to be equal to explicit Wedgelet (that is, Mode 1), according to the example of 3D-HEVC, as summarized in Table 2 above.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
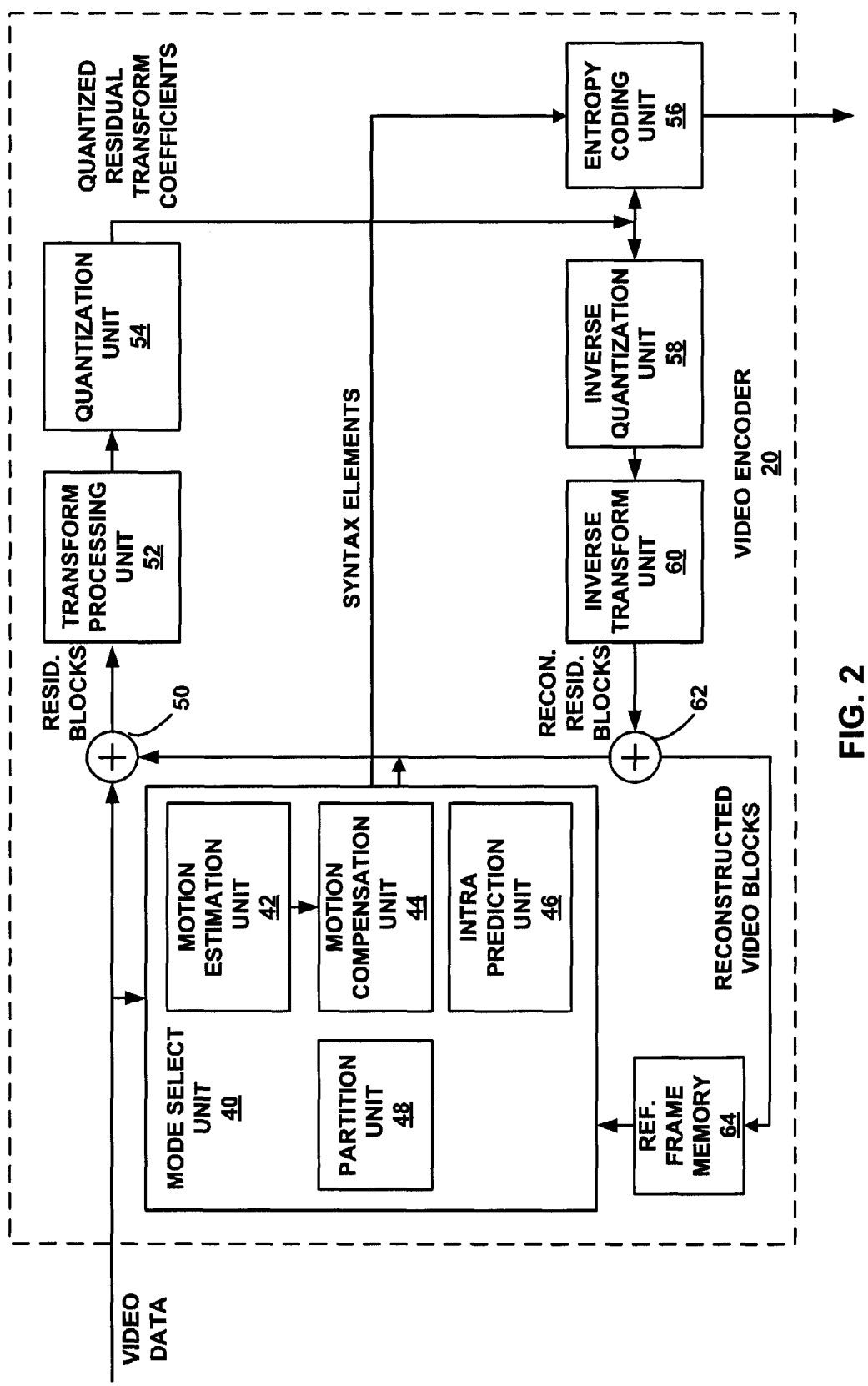
FIG. 2 is a block diagram illustrating an example of a video encoder that may implement techniques for signaling depth modeling modes for depth map coding.

FIG. 2 is a block diagram illustrating an example of video encoder 20 that may implement techniques for signaling depth modeling modes for depth map coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM), in accordance with the techniques of this disclosure. Mode select unit 40 may initially determine whether any of the DMM modes, such as DMM mode 3, should be disabled, e.g., based on any or all of the criteria described above with respect to FIG. 1. Mode select unit 40 may determine whether an available DMM mode produces better coding results than an intra-prediction mode and the other DMM modes, e.g., using rate-distortion optimization (RDO). If a DMM mode is selected (or currently being tested), and the DMM mode is not a mode in which a pattern is explicitly signaled, such as DMM mode 3, intra-prediction unit 46 may perform the techniques of this disclosure for selecting the pattern, e.g., based on an intra-prediction mode of a co-located texture block. Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

In accordance with the techniques of this disclosure, entropy coding unit 56 may be configured to entropy code syntax data indicative of a DMM mode used to code a depth block. In particular, entropy coding unit 56 may be configured to code the syntax data indicative of the DMM mode based on the number of DMM modes that are available. For example, for PU sizes of depth blocks larger than 4×4 but less than 64×64, the number of DMM modes that are available may be changed from four to three when DMM mode 3 is not available. Entropy coding unit 56 may select a binarization table to binarize a mode index of a DMM mode for a depth block based on whether DMM mode 3 is available.

For example, when DMM mode 3 is available, entropy coding unit 56 may binarize a DMM mode index using a binarization table having four entries, whereas when DMM mode 3 is not available, entropy coding unit 56 may binarize the DMM mode index using a binarization table having only three indexes. Alternatively, entropy coding unit 56 may swap binarization values for DMM mode 4 and DMM mode 3 in the binarization table when DMM mode 3 is not available. Alternatively, the binarization table for DMM modes may binarize one of the DMM mode indexes for DMM modes 1, 2, and 4 to a one bit value and the DMM mode indexes for the other two DMM modes to respective two bit values. Alternatively, entropy coding unit 56 may unary code the mode indexes of modes 1, 2, and 4 when DMM mode 3 is not available.

When the depth block has a size of 4×4 or smaller (or when the depth block otherwise only has two modes available based on the size of the depth block), entropy coding unit 56 may determine that only one DMM mode is available when DMM mode 3 is disabled. Thus, if a DMM mode is selected for a depth block for which only one DMM mode is available, entropy coding unit 56 may skip coding of a syntax element indicative of a DMM mode, when DMM is selected. Instead, entropy coding unit 56 may simply code a one-bit flag indicating that DMM has been selected for the block, and a decoder, such as video decoder 30, can infer that the selected DMM mode is the one DMM mode that is available (e.g., explicit Wedgelet, or DMM mode 1).

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to determine, for a depth block of a depth component of video data, a co-located texture block of a corresponding texture component, when at least a portion of the texture block corresponds to a prediction unit of the texture component that is not intra-prediction coded: disable an inter-component Wedgelet depth modeling mode for the depth block, select an intra-prediction coding mode for the depth block other than the disabled inter-component Wedgelet depth modeling mode, and code the depth block using the selected intra-prediction coding mode.

Figure 3:
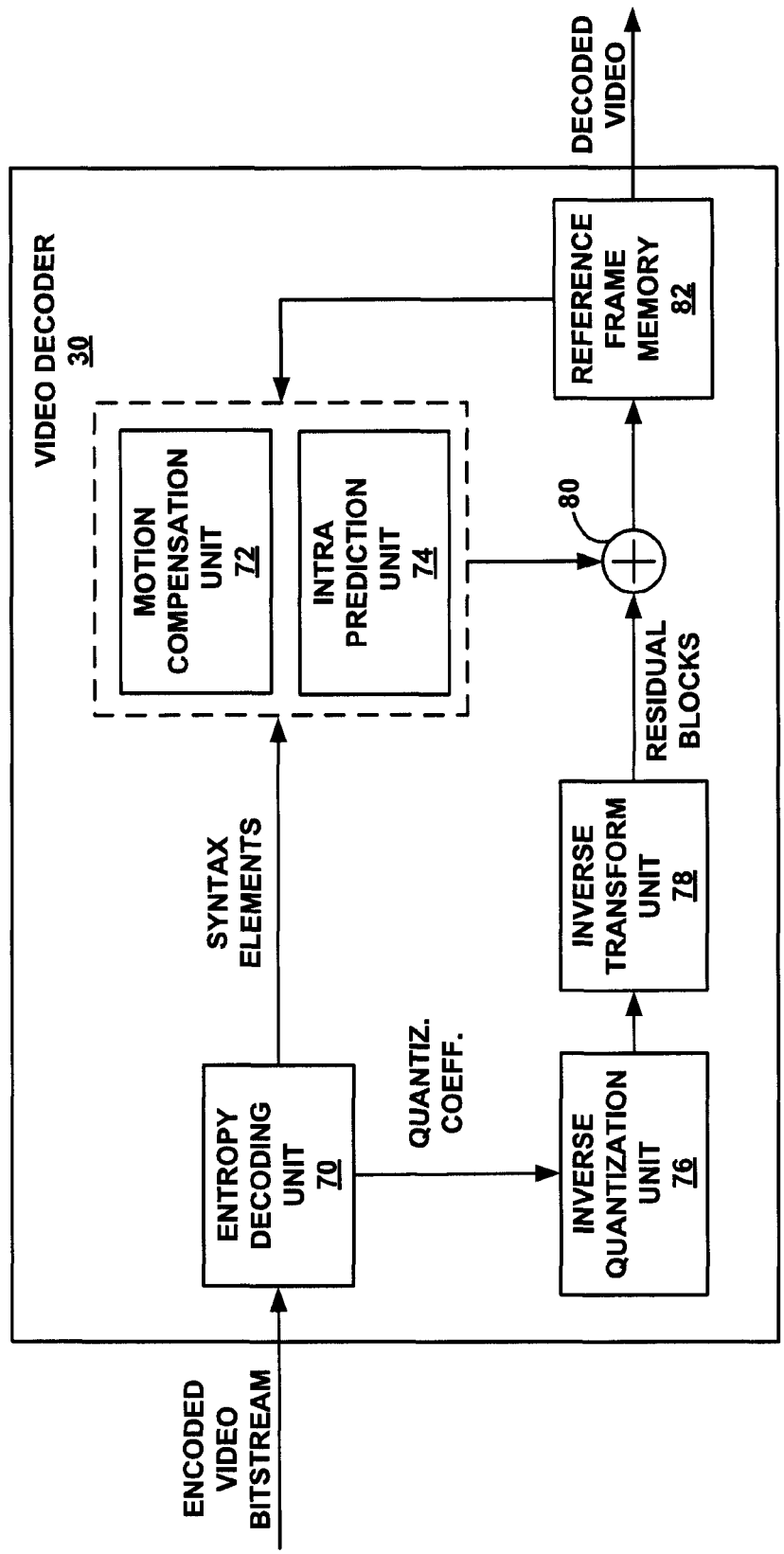
FIG. 3 is a block diagram illustrating an example of a video decoder that may implement techniques for signaling depth modeling modes for depth map coding.

FIG. 3 is a block diagram illustrating an example of video decoder 30 that may implement techniques for signaling depth modeling modes for depth map coding. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92.

In accordance with the techniques of this disclosure, entropy decoding unit 70 may be configured to entropy decode syntax data indicative of a DMM mode used to code a depth block. In particular, entropy decoding unit 70 may be configured to decode the syntax data indicative of the DMM mode based on the number of DMM modes that are available. For example, for PU sizes of depth blocks larger than 4×4 but less than 64×64, the number of DMM modes that are available may be changed from four to three when DMM mode 3 is not available. Entropy decoding unit 70 may select a binarization table to determine a mode index of a DMM mode for a depth block based on whether DMM mode 3 is available from a decoded, binarized value. That is, entropy decoding unit 70 may decode a syntax element to produce a binarized value, then look up the DMM mode index in the selected binarization table using the binarized value, i.e., the DMM mode index to which the binarized value is mapped in the binarization table.

For example, when DMM mode 3 is available, entropy decoding unit 70 may use a binarization table having four entries, whereas when DMM mode 3 is not available, entropy decoding unit 70 use a binarization table having only three entries. Alternatively, entropy decoding unit 70 may swap binarization values for DMM mode 4 and DMM mode 3 in the binarization table when DMM mode 3 is not available. Alternatively, the binarization table for DMM modes may map one of the DMM mode indexes for DMM modes 1, 2, and 4 to a one bit binarized value and the DMM mode indexes for the other two DMM modes to respective two bit binarized values. Alternatively, entropy decoding unit 70 may use unary decoding to determine the mode indexes of modes 1, 2, and 4 when DMM mode 3 is not available.

When the depth block has a size of 4×4 or smaller (or when the depth block otherwise only has two modes available based on the size of the depth block) and when DMM mode 3 is disabled, entropy decoding unit 70 may determine that only one DMM mode is available. Thus, if a DMM mode is selected for a depth block for which only one DMM mode is available, e.g., as indicated by the value of a one-bit syntax element, entropy decoding unit 70 may infer that the selected DMM mode is the one DMM mode that is available (e.g., explicit Wedgelet, or DMM mode 1). Thus, entropy decoding unit 70 need not receive or decode a syntax element that explicitly indicates which DMM mode is used, because entropy decoding unit 70 can determine that only one DMM mode is available, e.g., based on the size of the depth block, that DMM mode 3 is disabled, and a decoded value indicating that DMM is used (rather than intra-prediction alone).

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, intra-prediction unit 74 may be configured to code depth blocks of a depth map using a depth modeling mode (DMM). Intra-prediction unit 74 may initially determine whether any of the DMM modes, such as DMM mode 3, should be disabled, e.g., based on any or all of the criteria described above with respect to FIG. 1. If a DMM mode is selected (e.g., as indicated by syntax elements received from entropy decoding unit 70), and the DMM mode is not a mode in which a pattern is explicitly signaled, such as DMM mode 3, intra-prediction unit 74 may perform the techniques of this disclosure for selecting the pattern, e.g., based on an intra-prediction mode of a co-located texture block. Data for a texture image corresponding to a depth map may be stored in reference frame memory 82. Motion compensation unit 72 may also be configured to inter-predict depth blocks of a depth map.

Inverse quantization unit 76 inverse quantizes, i.e., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 or intra-prediction unit 74 generates the predictive block for the current video block (e.g., a texture block or a depth block) based on motion vectors or other syntax elements, video decoder 30 forms a decoded video block by summing the residual blocks from inverse transform unit 78 with the corresponding predictive blocks generated by motion compensation unit 82 or intra-prediction unit 74. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

In this manner, video decoder 30 of FIG. 3 represents an example of a video decoder configured to determine, for a depth block of a depth component of video data, a co-located texture block of a corresponding texture component, when at least a portion of the texture block corresponds to a prediction unit of the texture component that is not intra-prediction coded: disable an inter-component Wedgelet depth modeling mode for the depth block, select an intra-prediction coding mode for the depth block other than the disabled inter-component Wedgelet depth modeling mode, and code the depth block using the selected intra-prediction coding mode.

Figure 4:
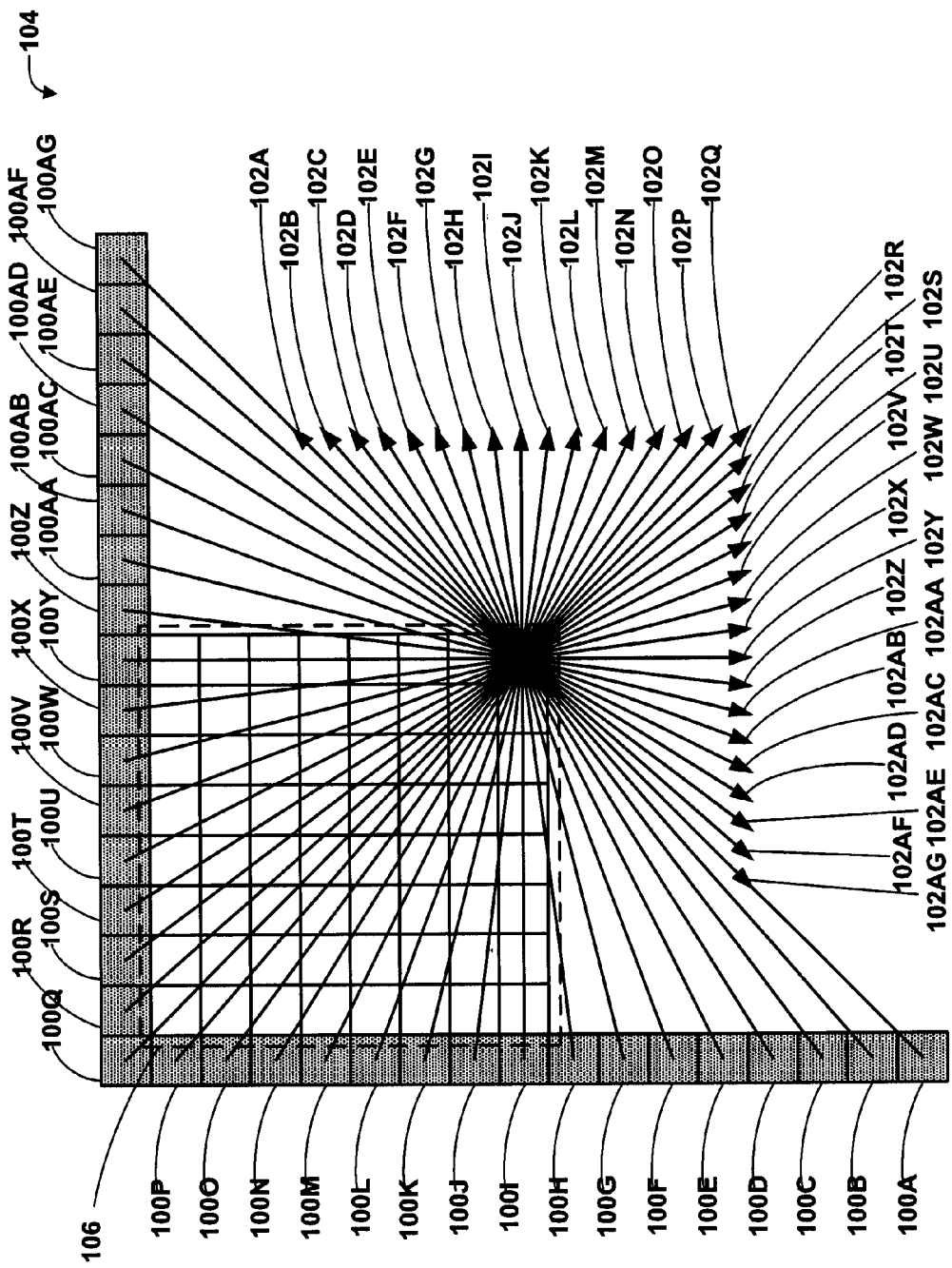
FIG. 4 is a conceptual diagram illustrating various potential directional intra-prediction modes for a block of video data.

FIG. 4 is a conceptual diagram illustrating various potential directional intra-prediction modes for a block of video data. In particular, block 106 represents an example of an 8×8 block of pixels (also referred to as "samples") of video data. Intra-prediction generally involves predicting values for block 106 using values of neighboring pixels, such as one or more of neighboring pixels 100A-100AG (neighboring pixels 100). Directional intra-prediction modes, also referred to as angular intra-prediction modes, are represented by arrows 102A-102AG (arrows 102). In general, in angular prediction modes, values of one or more of neighboring pixels 100 is used to predict values of pixels of block 106, in the example of FIG. 4.

In WD7, the angular intra-prediction modes are indexed from 2 to 34. In the example of WD7, the indexes for angular intra-prediction modes begin at 2 (mapped to the angular intra-prediction direction represented by arrow 102A) and proceed incrementally to 34 in correspondence with the incremental enumeration of arrows 102. For example, arrow 102B corresponds to mode 3, arrow 102C corresponds to mode 4, and so on. WD7 also provides three non-angular intra-prediction modes, including planar mode (mode index 0), DC mode (Mode index 1), and a from-Luma (mode index.

In general, the tail end of arrows 102 represents a relative one of neighboring pixels 100 from which a value is retrieved, while the head of arrows 102 represents the direction in which the retrieved value is propagated to form a predictive block for block 106. Pixels through which the line for arrows 102 represent pixel locations into which the values are propagated. It should be understood that arrows 102 generally represent the direction of the angular intra-prediction modes relative to a lower-right pixel of block 106, and that parallel directions may be used for other pixels of block 106.

As explained above, in some examples, each of the angular intra-prediction modes shown in FIG. 4 may be associated with a set of Wedgelet patterns. For example, arrow 102A may represent an intra-prediction mode corresponding to a set of Wedgelet patterns that have an angle similar or identical to the angle of arrow 102A. The set of Wedgelet patterns associated with an angular intra-prediction mode may have angles that are parallel to, or nearly parallel to (e.g., within a certain degree of) the angle of the angular intra-prediction mode.

Figure 5A:
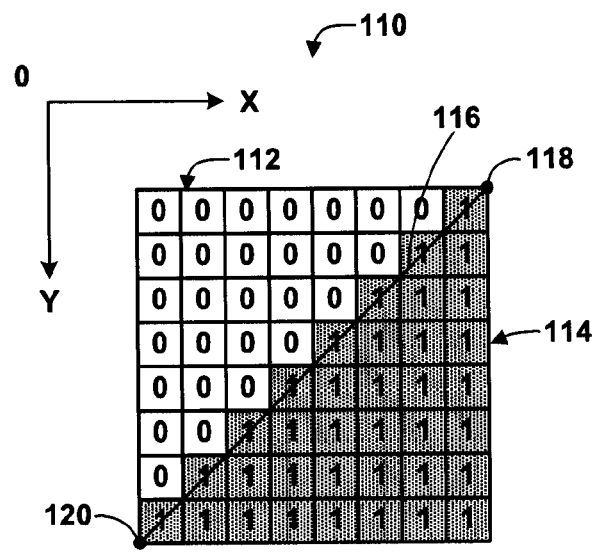
FIGS. 5A and 5B are conceptual diagrams illustrating examples of depth modeling modes.
Figure 5B:
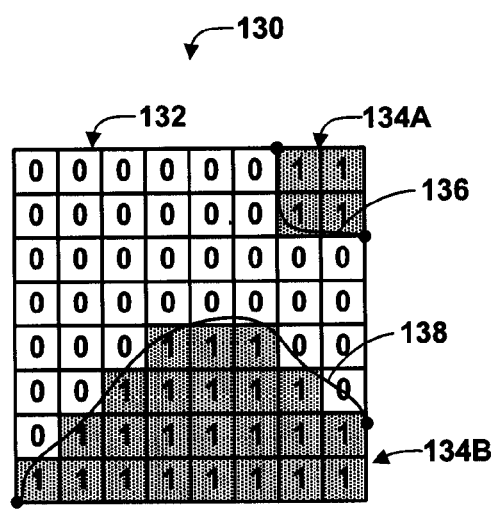

FIGS. 5A and 5B are conceptual diagrams illustrating examples of depth modeling modes. FIG. 5A, for example, illustrates depth block 110 that is partitioned using Wedgelet partitioning, and FIG. 5B, as another example, illustrates depth block 130 that is partitioned using Contour partitioning. 3D-HEVC includes techniques for depth modeling modes (DMMs) for partitioning blocks along with the intra-prediction modes to code an intra-prediction unit of a depth slice. HTM version 3.1 applies a DMM method for intra coding of depth maps, which may better represent sharper edges in depth maps in some cases.

As described above, e.g., with respect to Table 2, 3D-HEVC provides four DMM modes: Mode 1 (explicit Wedgelet signaling), Mode 2 (intra-predicted Wedgelet partitioning), Mode 3 (inter-component Wedgelet partitioning), and Mode 4 (inter-component Contour partitioning). In all four modes, a video coder, such as video encoder 20 or video decoder 30, may partition a depth block into two regions specified by a DMM pattern, where each region is represented by a constant value. The DMM pattern can be either explicitly signaled (mode 1), predicted by spatially neighboring blocks (mode 2), or predicted using a co-located texture block (mode 3 and mode 4).

There are two partitioning models defined in DMM, including Wedgelet partitioning and the Contour partitioning. Again, FIG. 5A illustrates an example of Wedgelet partitioning, and FIG. 5B illustrates an example of Contour partitioning. Each individual square within depth blocks 110 and 130 represents a respective individual pixel of depth blocks 110 and 130, respectively. Numeric values within the squares represent whether the corresponding pixel belongs to region 112 (value "0" in the example of FIG. 5A) or region 114 (value "1" in the example of FIG. 5A). Shading is also used in FIG. 5A to indicate whether a pixel belongs to region 112 (white squares) or region 114 (grey shaded squares).

Each pattern (that is, both Wedgelet and Contour) can be defined by an array of size $u_B \times v_B$ binary digit labeling of whether the corresponding sample (that is, pixel) belongs to region $P_1$ or $P_2$ (where $P_1$ corresponds to region 112 in FIG. 5A and region 132 in FIG. 5B, and $P_2$ corresponds to region 114 in FIG. 5A and region 134A, 134B in FIG. 5B), where $u_B$ and $v_B$ represent the horizontal and vertical size of the current PU, respectively. In the examples of FIG. 5A and FIG. 5B, the PU corresponds to blocks 110 and 130, respectively. Video coders, such as video encoder 20 and video decoder 30, may initialize Wedgelet patterns at the beginning of coding, e.g., the beginning of encoding or the beginning of decoding.

As shown in the example of FIG. 5A, for a Wedgelet partition, depth block 110 is partitioned into two regions, region 112 and region 114, by straight line 116, with start point 118 located at (Xs, Ys) and end point 120 located at (Xe, Ye). In the example of FIG. 5A, start point 118 may be defined as point (8, 0) and end point 120 may be defined as point (0, 8).

As shown in the example of FIG. 5B, for Contour partitioning, a depth block, such as depth block 130, can be partitioned into two irregularly-shaped regions. In the example of FIG. 5B, depth block 130 is partitioned into region 132 and region 134A, 134B. Although pixels in region 134A are not immediately adjacent to pixels in region 134B, regions 134A and 134B are defined to form one single region, for the purposes of predicting a PU of depth block 130. The Contour partitioning is more flexible than the Wedgelet partitioning, but difficult to signal. In DMM mode 4, in the case of 3D-HEVC, Contour partitioning pattern is implicitly derived using reconstructed luma samples of the co-located texture block.

In this manner, a video coder, such as video encoder 20 and video decoder 30, may use line 116, as defined by start point 118 and end point 120, to determine whether a pixel of depth block 110 belongs to region 112 (which may also be referred to as region "$P_1$") or to region 114 (which may also be referred to as region "$P_2$"). Likewise, a video coder may use lines 136, 138 of FIG. 5B to determine whether a pixel of depth block 130 belongs to region 132 (which may also be referred to as region "$P_1$") or to region 134 (which may also be referred to as region "$P_2$"). Regions "P1" and "P2" are default naming conventions for different regions partitioned according to DMM, and thus, region $P_1$ of depth block 110 should not be considered the same region as region $P_1$ of depth block 130.

As noted above, each of the DMMs may be defined by whether the DMM uses Wedgelet or Contour partitioning, and whether the pattern is explicitly signaled or implicitly determined. In accordance with the techniques of this disclosure, mode 3 (inter-component Wedgelet partitioning) may be disabled in certain circumstances. Moreover, when enabled and used, the Wedgelet pattern may be determined based on a corresponding intra-prediction mode FIGS. 6A and 6B illustrate examples of depth blocks in a depth component and co-located texture blocks in a corresponding texture component. For example, FIG. 6A illustrates texture component 150 and depth component 154. Depth component 154 includes depth block 156. Depth block 156 may represent a single prediction unit (PU) of depth component 154. Texture component 150 may correspond to depth component 154 in that texture component 150 and depth component 154 may belong to the same view, and correspond to the same temporal instance. That is, texture component 150 and depth component 154 may be included within the same access unit.

In the example of FIG. 6A, texture block 152, which is co-located with depth block 156, corresponds to a single PU of texture component 150. As noted above, in certain examples, DMM mode 3 (inter-component Wedgelet partitioning) is disabled for a depth block unless a co-located texture block fully belongs to a PU that is intra-coded. In such examples, if texture block 152 is intra-coded, DMM mode 3 may be enabled for depth block 156. In some examples, when DMM mode 3 is enabled for depth block 156, and when texture block 152 is intra-coded, the intra-prediction mode for texture block 152 may be used to predict the Wedgelet pattern for depth block 156.

FIG. 6B illustrates an example in which texture component 160 corresponds to depth component 166. Depth component 166 includes depth block 168, which represents a PU of depth component 166. Texture block 162 is co-located with depth block 168. However, texture block 162 corresponds to two PUs 164A, 164B. That is, PUs 164A and 164B form separate, non-overlapping portions of texture block 162. Thus, texture block 162 represents an example of a texture block, co-located with a depth block in a depth component, that does not fully correspond to a single PU but instead corresponds to a plurality of PUs.

In some examples, as discussed above, DMM mode 3 may be disabled when a depth block, such as depth block 168, is co-located with a texture block, such as texture block 162, that does not correspond to a single PU. Alternatively, DMM mode 3 may be disabled when a texture block corresponds to a plurality of PUs, and none of the PUs is intra-coded, or when at least one of the PUs is not intra-coded. Thus, DMM mode 3 may be enabled for depth block 168 when at least one of PUs 164A, 164B is intra-coded in one example, or, in another example, when each of PUs 164A, 164B is intra-coded.

Figure 7:
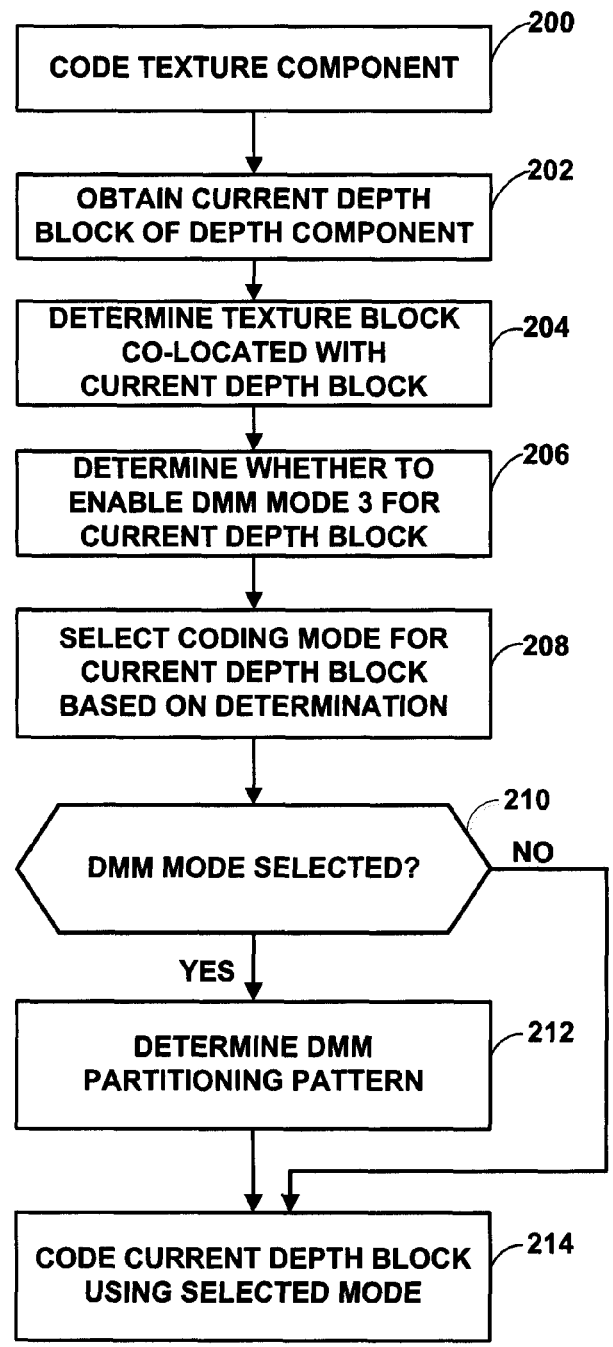
FIG. 7 is a flowchart illustrating an example method for encoding a current depth block.

FIG. 7 is a flowchart illustrating an example method for encoding a current depth block. The current depth block may comprise a current CU or a portion of the current CU, e.g., a portion corresponding to a PU. The method of FIG. 7 may be performed by a video coding device, such as video encoder 20 or video decoder 30. For purposes of example, the method of FIG. 7 is described with respect to video decoder 30. Certain changes may be made to the method to be performed by a video encoder, such as video encoder 20. Examples of changes are noted below.

In this example, video decoder 30 first codes a texture component (200). That is, video decoder 30 decodes each block of the texture component, based on syntax information signaled for the blocks of the texture component. When the method is performed by video encoder 20, video encoder 20 may determine which coding modes to use for each block of the texture component and signal syntax information for the blocks indicating selected coding modes for the blocks.

Video decoder 30 may then obtain a current depth block of a depth component (202). In this example, the current depth block may be any depth block of the depth component. The depth component corresponds to the depth component, e.g., corresponds to the same temporal location and the same view. Video decoder 30 may then determine a texture block of the texture component that is co-located with the current depth block (204).

Video decoder 30 may then determine whether to enable DMM mode 3 (DMM inter-component Wedgelet mode) for the current depth block (206). Video decoder 30 may use any of the techniques of this disclosure for determining whether to enable DMM mode 3 for the current depth block, e.g., based on whether the co-located texture block is intra-coded, intra-coded using a mode other than DC and planar mode, belongs to a single PU or a plurality of PUs, a coding mode for a top-left 4×4 block of the co-located texture block, or the like.

Video decoder 30 may then select a coding mode for the current depth block based on the determination of whether DMM mode 3 is enabled (208). When DMM mode 3 is disabled, video decoder 30 is configured not to select DMM mode 3. Video decoder 30 may select the coding mode based on implicit and/or explicit criteria. For example, video decoder 30 may reduce a number of available DMM modes, e.g., from four to three or from two to one (based on the size of the current depth block) or modify a binarization table for binarized codewords assigned to the various DMM modes.

Video decoder 30 may then determine whether a DMM mode was selected for the current depth block (210). If a DMM mode was not selected ("NO" branch of 210), video decoder 30 may proceed to code the current depth block using the selected mode (214). Alternatively, if a DMM mode was selected ("YES" branch of 210), video decoder 30 may further determine a DMM partitioning pattern for the selected DMM mode (212). For example, the selected mode may indicate whether the DMM partitioning is Wedgelet partitioning or Contour partitioning, and whether the partitions are implicitly or explicitly signaled.

Furthermore, in the case that DMM mode 3 is enabled and selected, video decoder 30 may determine the partitioning pattern based on an intra-prediction mode of the co-located texture block. That is, video decoder 30 may predict the Wedgelet pattern for the current depth block based on the intra-prediction mode used to code the co-located texture block in the corresponding texture component. For example, each intra-prediction mode may be mapped to exactly one Wedgelet pattern. Alternatively, each intra-prediction mode may be mapped to a set of Wedgelet patterns, and video decoder 30 may be configured to analyze each of the Wedgelet patterns in the set to which the intra-prediction mode for the co-located texture block is mapped to determine an appropriate one of the set of Wedgelet patterns. After determining the DMM partitioning pattern, video decoder 30 may proceed to code the current depth block using the selected mode and the determined partitioning patter (214).

As described above, when performed by video decoder 30, coding the current depth block comprises decoding the current depth block. That is, video decoder 30 may form a predicted block for the current depth block based on the selected coding mode, then decode transform coefficients of one or more transform units for the current depth block. Video decoder 30 may then inverse transform the transform coefficients to produce a residual block, which video decoder 30 may combine with the predicted block to reproduce original values for the current depth block. Alternatively, when performed by video encoder 20, coding the current depth block may comprise encoding the current depth block, which may include subtracting values of a predicted block for the current depth block from values of the current depth block itself to form a residual block, then transforming values of the residual block to produce transform coefficients, then quantizing and entropy encoding the transform coefficients.

In this manner, the method of FIG. 7 represents an example of a method including determining, for a depth block of a depth component of video data, a co-located texture block of a corresponding texture component, when at least a portion of the texture block corresponds to a prediction unit of the texture component that is not intra-prediction coded: disabling an inter-component Wedgelet depth modeling mode for the depth block, selecting an intra-prediction coding mode for the depth block other than the disabled inter-component Wedgelet depth modeling mode, and coding the depth block using the selected intra-prediction coding mode.

Figure 8:
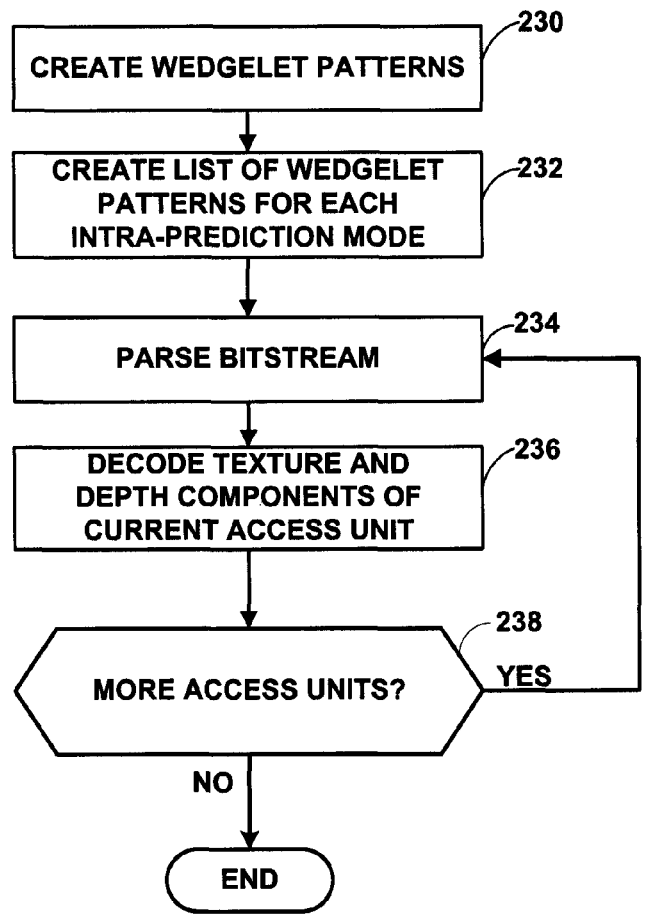
FIG. 8 is a flowchart illustrating an example method for decoding a bitstream.

FIG. 8 is a flowchart illustrating an example method for decoding a bitstream, e.g., by video decoder 30. A reciprocal method may be performed by video encoder 20. Video decoder 30 may be subject to a constraint that when a depth block is coded with inter-component Wedgelet mode, the co-located texture PU is coded using an angular intra-prediction mode, in this example. That is, DMM mode 3 (inter-component Wedgelet mode) may only be available when the co-located texture block corresponds to a single PU that is coded using an angular intra-prediction mode, as discussed above, for the example of FIG. 8.

In the example of FIG. 8, video decoder 30 may create Wedgelet patterns at the beginning of a decoding process of one bitstream (230). Afterwards, video decoder 30 may create a list of Wedgelet patterns for each intra-prediction mode (232). In one example, for each angular intra-prediction mode TexIntraMode, video decoder 30 may construct a list WdgIdxLst[TexIntraMode]. For example, using the value of TexIntraMode and a pre-defined threshold parameter tr, video decoder 30 may determine, for each Wedgelet pattern (indexed by a value idxW), an index value idxM that is an index to an intra-prediction mode. The value of tr may be, for example, 1, 0.5, 4, or another value. In some examples, video encoder 20 may select a value of tr and signal the value of tr for use by video decoder 30. Video decoder 30 may determine whether to add the Wedgelet pattern represented by idxW to the list of Wedgelet patterns for the intra-prediction mode indexed by idxM, according to the following analysis: if ((|IdxM−TexIntraMode)|<=tr) AND (idxW>1) AND (idxW is not a member of WdgIdxLst[TexIntraMode])), add idxW to the list WdgIdxLst[TexIntraMode].

In one example, for each video decoder 30 may iterate through the created Wedgelet patterns and, for each of the Wedgelet patterns, determine an index value for a current Wedgelet pattern. Video decoder 30 may then retrieve coordinates of the starting point (Xs, Ys) and end point (Xe, Ye) for the current Wedgelet pattern. Then, for each intra-prediction mode i from 2 to 34 (in the example of 3D-HEVC), video decoder 30 may obtain (Hi, Vi) from a data structure stored in memory representative of Table 1. Moreover, video decoder 30 may calculate a value D[i] for each intra-prediction mode, e.g., according to formula (1) below:

$$D[i]=|Vi*(Xs-Xe)-Hi*(Ye-Ys)| \qquad (1)$$

Video decoder 30 may then set a value idxOpt equal to −1 and a value Min Value equal to 16384 (or another large integer value that is always bigger than any possible value of D[i], for any i and any Wedgelet pattern). For each i from 2 to 34, if D[i] is smaller than Min Value, video decoder 30 may set Min Value equal to D[i] and set idxOpt to i. Video decoder 30 may continue to iterate through the intra-prediction modes to produce a final value of idxOpt, which video decoder 30 may use to determine whether to add the Wedgelet pattern idxW to the set of Wedgelet patterns for the intra-prediction mode represented by idxOpt, as discussed above.

After creating the lists of Wedgelet patterns for each intra-prediction mode, video decoder 30 may decode each access unit of the bitstream one by one, until all access units have been decoded. In particular, video decoder 30 may parse the bitstream (234) to retrieve a current access unit. Video decoder 30 may then decode both texture and depth components of the current access unit (236). Video decoder 30 may then determine whether there are more access units in the bitstream (238). If there are more access units in the bitstream ("YES" branch of 238), video decoder 30 may continue to parse the bitstream (234) and decode the next access unit (236). Otherwise, if there are not more access units in the bitstream ("NO" branch of 238), the decoding process may end.

Figure 9:
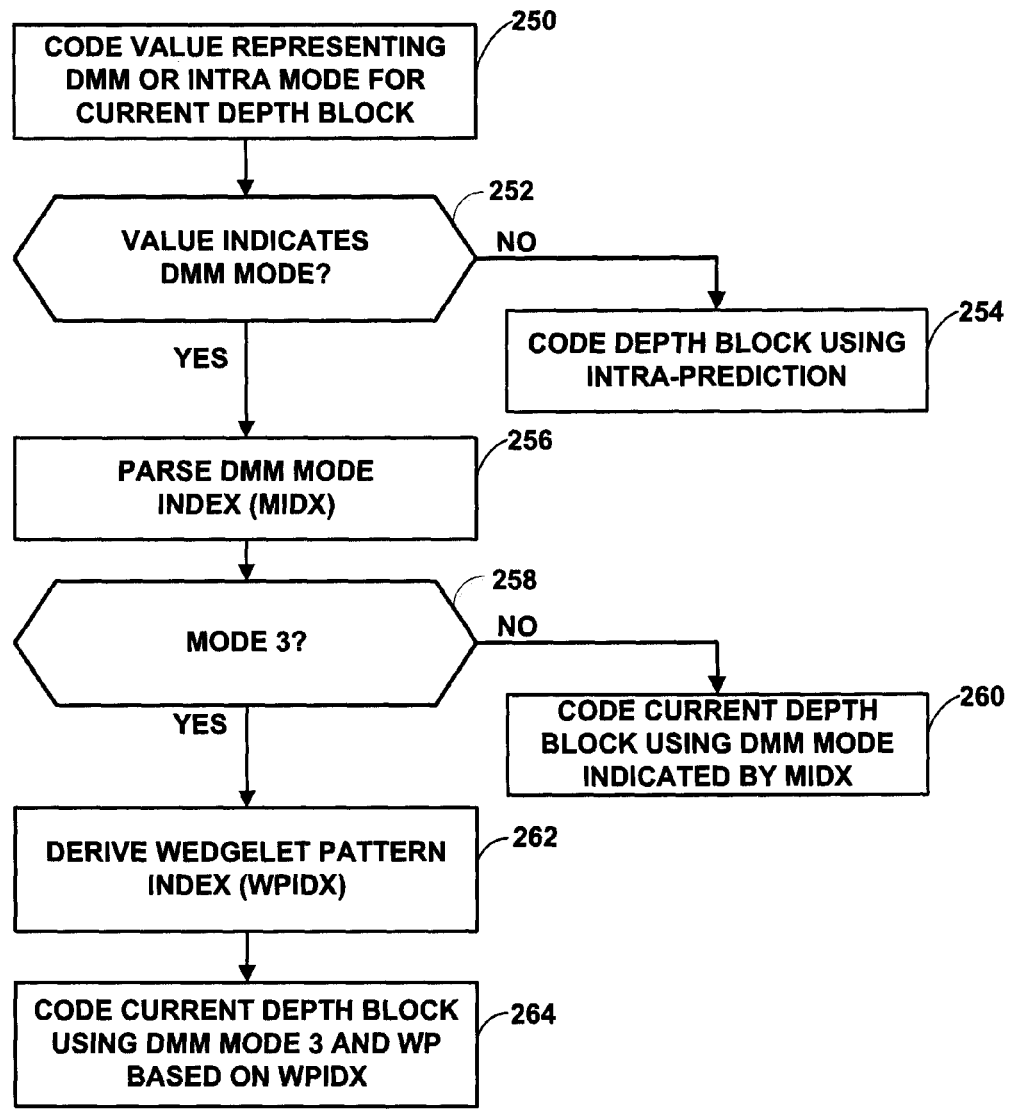
FIG. 9 is a flowchart illustrating an example method for decoding a depth block in accordance with the techniques of this disclosure.

FIG. 9 is a flowchart illustrating an example method for decoding a depth block in accordance with the techniques of this disclosure. The method of FIG. 9 may be performed by video decoder 30. A similar, reciprocal method may be performed by video encoder 20. In this example, video decoder 30 may first code a value for a depth block representing whether the depth block is coded using a depth modeling mode (DMM) or an intra-prediction mode (250). For example, video decoder 30 may parse a one-bit flag to check whether a current depth PU is to be decoded using a conventional intra-prediction mode or a DMM mode. If the value indicates that the current depth block is not coded using a DMM mode ("NO" branch of 252), video decoder 30 may code the depth block using a signaled intra-prediction mode (254).

On the other hand, if the value indicates that the current depth block is coded using a DMM mode ("YES" branch of 252), video decoder 30 may parse a DMM mode index value (MIDX) (256) indicative of the selected DMM mode index. If the MIDX value does not correspond to DMM mode 3 (inter-component Wedgelet mode) ("NO" branch of 258), video decoder 30 may code the current depth block using the DMM mode indicated by MIDX (260). This process of coding using the signaled DMM mode, for modes other than DMM mode 3, may generally remain the same as in the techniques of 3D-HEVC.

However, if the MIDX value does correspond to DMM mode 3 ("YES" branch of 258), video decoder 30 may derive a Wedgelet pattern index (WPIDX) value to use to code the current depth block (262) in accordance with the techniques of this disclosure. For example, video decoder 30 may perform the following process to derive the value of WPIDX: first, video decoder 30 may set a value TexIntraMode to correspond to the intra-prediction mode of the co-located luma texture block for the current depth block. Next, video decoder 30 may determine a list of indexes to Wedgelet patterns based on the intra-prediction mode of the co-located luma texture block. That is, video decoder 30 may determine WdgIdxLst[TexIntraMode]. Video decoder 30 may then perform a search process to determine a Wedgelet pattern from among the list defined by WdgIdxLst[TexIntraMode].

The search process may be as follows. Video decoder 30 may obtain a Wedgelet pattern from the list and calculate the average value of the components in the co-located luma texture block that correspond to components in the Wedgelet pattern labeled by "0" as an average value for $P_1$. Video decoder 30 may also calculate the average value of the components in the co-located texture block that correspond to components in the Wedgelet pattern labeled by "1" as an average value for $P_2$. Video decoder 30 may then generate a prediction block P with the same size as that of the co-located luma texture block, where for each component of P, the component is valued as "$P_1$" if the corresponding component in the Wedgelet pattern is labeled by "0;" otherwise, the component is valued as "$P_2$." Video decoder 30 may then calculate the sum of squared difference between each component of the luma texture block and the prediction block P as D. If D is smaller than MinValueWedgelet, video decoder 30 may set MinValue to D and set idxOpt to WdgIdx. Video decoder 30 may perform this search process iteratively for each Wedgelet pattern in WdgIdxLst[TexIntraMode]. Ultimately, video decoder 30 may determine that the Wedgelet pattern is the Wedgelet pattern corresponding to idxOpt at the end of the search process.

Alternatively, in another example, the initial creation of Wedgelet lists as discussed above may be skipped, and the following search process may be performed. Video decoder 30 may instead initially set values idxW equal to zero, idxOpt equal to −1, and MinValue equal to 16384 (or another suitably high-valued integer). Video decoder 30 may then determine the intra-prediction mode of the co-located luma texture block as idxT, and obtain a predefined threshold value tr.

For each Wedgelet pattern indexed by idxW, video decoder 30 may perform the mapping process described above, with index idxM as the returned index to the intra predictin mode. If |idxM−idxT|<tr and idxM>1, the following may apply: video decoder 30 may calculate the average value of the components in the co-located luma texture block with the corresponding components in the Wedgelet pattern being labeled by "0" as $P_1$, and calculate the average value of the components in the co-located luma texture block with the corresponding components in the Wedgelet pattern being labeled "1" as $P_2$. Video decoder 30 may then generate a prediction block P with the same size as that of the co-located luma texture block, where for each component of P, the component is valued as "$P_1$" if the corresponding component in the Wedgelet pattern is labeled by "0;" otherwise, the component is valued as "$P_2$." Video decoder 30 may then calculate the sum of squared difference between each component of the luma texture block and the prediction block P as D. If D is smaller than MinValue, video decoder 30 may set MinValue to D and set idxOpt to idxW. Video decoder 30 may perform this search process iteratively for each Wedgelet pattern in WdgIdxLst[TexIntraMode]. Ultimately, video decoder 30 may determine that the Wedgelet pattern is the Wedgelet pattern corresponding to idxOpt at the end of the search process.

Video decoder 30 may then code the current depth block using DMM mode 3 and the Wedgelet pattern (WP) based on WPIDX, as determined from step 262 (264). That is, video decoder 30 may decode the current depth block with the inter-component Wedgelet mode using the Wedgelet pattern identified by idxOpt. This decoding process may conform substantially to the decoding process of current 3D-HEVC. However, it should be noted that the process of determining the DMM mode and, when DMM mode 3 is selected, the process of determining the Wedgelet pattern, may conform to the techniques of this disclosure.

The examples discussed above with respect to FIGS. 8 and 9 were described as using the intra-prediction mode of the co-located luma texture block. However, it should be understood that in other examples, the intra-prediction mode used to code a top-left 4×4 block of the co-located luma texture block may be determined, rather than the intra-prediction mode for the full co-located texture block. This may allow for DMM mode 3 to be used to code the depth block even when the co-located texture block corresponds to multiple PUs, even when at least one of the PUs of the co-located texture block is not intra-prediction coded. DMM mode 3 may be disabled when the top-left 4×4 block of the co-located luma texture block is not intra-prediction coded.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    determining, for a depth block of a depth component of video data, a co-located texture block of a corresponding texture component; and
    when at least a portion of the texture block corresponds to a prediction unit of the texture component that is not intra-prediction coded:
        disabling an inter-component Wedgelet depth modeling mode for the depth block;
        selecting an intra-prediction coding mode for the depth block other than the disabled inter-component Wedgelet depth modeling mode; and
        coding the depth block using the selected intra-prediction coding mode.

2. The method of claim 1, wherein the at least portion of the texture block corresponding to the prediction unit that is not intra-prediction coded comprises a top-left 4×4 pixel block.

3. The method of claim 1, further comprising, when at least a portion of the texture block corresponds to a prediction unit of the texture component that is intra-prediction coded using an intra-prediction mode comprising one of DC and planar mode:
    disabling the inter-component Wedgelet depth modeling mode for the depth block;
    selecting a second intra-prediction coding mode for the depth block other than the disabled inter-component Wedgelet depth modeling mode; and
    coding the depth block using the second intra-prediction coding mode.

4. The method of claim 3, wherein the at least portion of the texture block corresponding to the prediction unit that is intra-prediction coded comprises a top-left 4×4 pixel block.

5. The method of claim 1, further comprising, when a slice comprising the texture block is not an Intra-slice:
    disabling the inter-component Wedgelet depth modeling mode for the depth block;
    selecting a second intra-prediction coding mode for the depth block other than the disabled inter-component Wedgelet depth modeling mode; and
    coding the depth block using the second intra-prediction coding mode.

6. The method of claim 1, further comprising coding the depth block using the inter-component Wedgelet depth modeling mode only when the texture block corresponds to a single prediction unit that is intra-prediction coded.

7. The method of claim 1, further comprising coding the depth block using the inter-component Wedgelet depth modeling mode only when the texture block corresponds to a plurality of prediction units and at least one of the plurality of prediction units is intra-prediction coded.

8. The method of claim 1, further comprising:
    selecting the inter-component Wedgelet depth modeling mode for the depth block;
    when at least a portion of the texture block corresponds to a prediction unit that is intra-prediction coded, predicting a Wedgelet pattern for the depth block based on an intra-prediction mode for the texture block; and
    coding the depth block using the predicted Wedgelet pattern.

9. The method of claim 8, wherein each of a plurality of directional intra-prediction modes is mapped to a respective Wedgelet pattern, wherein the intra-prediction mode comprises one of the plurality of directional intra-prediction modes, and wherein predicting the Wedgelet pattern comprises selecting the Wedgelet pattern to which the intra-prediction mode is mapped.

10. The method of claim 8, wherein each of a plurality of directional intra-prediction modes is mapped to a respective set of Wedgelet patterns, and wherein predicting the Wedgelet pattern comprises testing each of the Wedgelet patterns in the set of Wedgelet patterns to which the intra-prediction mode is mapped.

11. The method of claim 8, wherein predicting the Wedgelet pattern comprises predicting the Wedgelet pattern for the depth block based on the intra-prediction mode for the texture block only when the intra-prediction mode comprises an intra-prediction mode other than DC mode and planar mode.

12. The method of claim 8, wherein the at least portion of the texture block comprises all of the texture block.

13. The method of claim 8, wherein the at least portion of the texture block comprises an upper-left 4×4 block of the texture block.

14. The method of claim 13, wherein predicting the Wedgelet pattern comprises predicting the Wedgelet pattern for the depth block based on the intra-prediction mode for the texture block only when the intra-prediction mode comprises an intra-prediction mode other than DC mode and planar mode.

15. The method of claim 1, wherein when the inter-component Wedgelet depth modeling mode for the depth block is disabled and when the depth block comprises a block larger than 4×4 pixels and less than 64×64 pixels, the method further comprises:
    coding a value representative of the selected intra-prediction mode for the depth block based on a number of available depth modeling modes for the depth block.

16. The method of claim 15, wherein the number of available depth modeling modes for the depth block is reduced relative to a full number of available depth modeling modes based at least in part on the inter-component Wedgelet depth modeling mode being disabled.

17. The method of claim 16, wherein the full number of available depth modeling modes comprises four depth modeling modes, and wherein the number of available depth modeling modes for the depth block comprises three depth modeling modes.

18. The method of claim 15, wherein the available depth modeling modes comprise an inter-component Contour mode, wherein a first signaling value corresponds to the inter-component Contour mode, wherein a second signaling value corresponds to the inter-component Wedgelet mode, wherein the selected intra-prediction mode comprises the inter-component Contour mode, and wherein coding the value representative of the selected intra-prediction mode comprises coding the second signaling value based on the inter-component Wedgelet depth modeling mode being disabled.

19. The method of claim 15, wherein coding the value representative of the selected intra-prediction mode comprises context adaptive binary arithmetic coding a binarized value for the selected intra-prediction mode, wherein the binarized value comprises a single bit.

20. The method of claim 15, wherein coding the value representative of the selected intra-prediction mode comprises context adaptive binary arithmetic coding a binarized value for the selected intra-prediction mode, wherein the binarized value comprises a unary binarized value.

21. The method of claim 1, wherein when the inter-component Wedgelet depth modeling mode for the depth block is disabled and when the depth block comprises a block smaller than or equal 4×4 pixels, the method further comprises:
determining that only a single depth modeling mode is available for the depth block; and
coding the depth block using the single depth modeling mode.

22. The method of claim 21, wherein the single depth modeling mode comprises an explicit Wedgelet mode.

23. The method of claim 21, further comprising skipping coding a value representative of the single depth modeling mode based on the determination that only the single depth modeling mode is available for the depth block.

24. The method of claim 1, wherein coding the depth block comprises decoding the depth block, wherein decoding the depth block comprises:
calculating at least one predictive block for the depth block;
calculating at least one residual block for the depth block; and
adding values of the predictive block to values of the residual block to produce a decoded version of the depth block.

25. The method of claim 1, wherein coding the depth block comprises encoding the depth block, wherein encoding the depth block comprises:
calculating at least one predictive block for the depth block;
calculating differences between values of the depth block and values of the predictive block to produce a residual block for the depth block; and
encoding values of the residual block.

26. A device for coding video data, the device comprising:
a memory configured to store video data; and
a video coder, implemented in circuitry, configured to:
determine, for a depth block of a depth component of video data, a co-located texture block of a corresponding texture component, and
when at least a portion of the texture block corresponds to a prediction unit of the texture component that is not intra-prediction coded:
disable an inter-component Wedgelet depth modeling mode for the depth block,
select an intra-prediction coding mode for the depth block other than the disabled inter-component Wedgelet depth modeling mode, and
code the depth block using the selected intra-prediction coding mode.

27. The device of claim 26, wherein the device comprises at least one of:
an integrated circuit;
a microprocessor; and
a wireless communication device that includes the video coder.

28. A device for coding video data, the device comprising:
means for determining, for a depth block of a depth component of video data, a co-located texture block of a corresponding texture component;
means for disabling an inter-component Wedgelet depth modeling mode for the depth block when at least a portion of the texture block corresponds to a prediction unit of the texture component that is not intra-prediction coded;
means for selecting an intra-prediction coding mode for the depth block other than the disabled inter-component Wedgelet depth modeling mode when at least a portion of the texture block corresponds to a prediction unit of the texture component that is not intra-prediction coded; and
means for coding the depth block using the selected intra-prediction coding mode when at least a portion of the texture block corresponds to a prediction unit of the texture component that is not intra-prediction coded.

29. A non-transitory computer-readable storage medium having stored thereon instructions that, when executed, cause a processor of a device for coding video data to:
determine, for a depth block of a depth component of video data, a co-located texture block of a corresponding texture component; and
when at least a portion of the texture block corresponds to a prediction unit of the texture component that is not intra-prediction coded:
disable an inter-component Wedgelet depth modeling mode for the depth block;
select an intra-prediction coding mode for the depth block other than the disabled inter-component Wedgelet depth modeling mode; and
code the depth block using the selected intra-prediction coding mode.

* * * * *